United States Patent
Baissac

(10) Patent No.: US 10,234,262 B2
(45) Date of Patent: Mar. 19, 2019

(54) SENSOR FOR MEASURING ANGULAR POSITION, AND MEASUREMENT COMPENSATION METHOD

(75) Inventor: Jean-Marc Baissac, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 1548 days.

(21) Appl. No.: 13/885,782

(22) PCT Filed: Oct. 28, 2011

(86) PCT No.: PCT/EP2011/005464
§ 371 (c)(1),
(2), (4) Date: Jul. 15, 2013

(87) PCT Pub. No.: WO2012/065686
PCT Pub. Date: May 24, 2012

(65) Prior Publication Data
US 2013/0297252 A1    Nov. 7, 2013

(30) Foreign Application Priority Data
Nov. 18, 2010 (FR) ...................... 10 04487

(51) Int. Cl.
G05B 13/02 (2006.01)
G05B 15/02 (2006.01)
(Continued)

(52) U.S. Cl.
CPC ............... *G01B 7/30* (2013.01); *F02P 7/067* (2013.01); *G01D 5/24476* (2013.01);
(Continued)

(58) Field of Classification Search
CPC ....... G01B 7/30; G02P 7/067; G01D 5/24476; G01D 21/00; G05B 11/011; G05B 13/02;
(Continued)

(56) References Cited

U.S. PATENT DOCUMENTS 3,082,374 A * 3/1963 Buuck ................... F41G 7/005
324/73.1
4,630,210 A * 12/1986 Salazar ............ G07B 17/00467
101/91
(Continued)

FOREIGN PATENT DOCUMENTS

CN    1820134    8/2006
DE    2939643    4/1981
(Continued)

OTHER PUBLICATIONS

International Search Report dated Dec. 16, 2011, corresponding to PCT/EP2011/005464.

*Primary Examiner* — Mohamed Charioui
*Assistant Examiner* — Catherine Rastovski
(74) *Attorney, Agent, or Firm* — Young & Thompson

(57) ABSTRACT

Method for compensating a reference measurement including a measurement of angular position $\alpha$ and a measurement of time T1 that are simultaneous at the time t1, for an angular position sensor of the type including a toothed wheel, includes the following steps: determination of a first measurement $\alpha$ of corresponding angular position at the moment in time t1 when a reference measurement is desired; triggering of a software acquisition function; substantially simultaneous acquisitions of a second measurement $\alpha'$ of the angular position and of a measurement T2 of the time by software acquisition at a time t2; estimation of an error $\Delta T$; and calculation of the compensated measurement of time, $T1=T2-\Delta T$. A Sensor for measuring angular position, of the
(Continued)

type including a toothed wheel, implementing such a compensation method is described.

5 Claims, 2 Drawing Sheets

(51) Int. Cl.

| | | |
|---|---|---|
| G05B 99/00 | (2006.01) | |
| F02P 5/15 | (2006.01) | |
| F02D 1/16 | (2006.01) | |
| G01D 21/00 | (2006.01) | |
| G04F 10/00 | (2006.01) | |
| G06F 17/40 | (2006.01) | |
| G06F 19/00 | (2011.01) | |
| G01B 7/30 | (2006.01) | |
| G05B 11/01 | (2006.01) | |
| F02P 7/067 | (2006.01) | |
| G01D 5/244 | (2006.01) | |
| F02D 41/00 | (2006.01) | |

(52) U.S. Cl.
CPC .............. *G05B 11/011* (2013.01); *F02D 1/16* (2013.01); *F02D 41/009* (2013.01); *F02P 5/15* (2013.01); *G01D 21/00* (2013.01); *G05B 13/02* (2013.01); *G05B 15/02* (2013.01); *G05B 99/00* (2013.01); *G06F 17/40* (2013.01); *G06F 19/00* (2013.01)

(58) Field of Classification Search
CPC ........... G05B 15/02; G05B 99/00; F02D 1/16; F02D 41/009; F02P 5/15; G06F 17/40; G06F 19/00
See application file for complete search history.

(56) References Cited

U.S. PATENT DOCUMENTS

| | | | | |
|---|---|---|---|---|
| 4,631,681 A * | 12/1986 | Salazar | ............ | G07B 17/00467 101/91 |
| 4,797,827 A | 1/1989 | Cockerham | | |
| 5,041,981 A * | 8/1991 | Sekozawa | ............. | F02D 41/045 701/1 |
| 5,621,644 A * | 4/1997 | Carson | ....................... | F01L 1/02 701/102 |
| 6,484,115 B1 * | 11/2002 | Freymond | ............. | F42C 11/065 702/104 |
| 6,530,360 B1 * | 3/2003 | Kondo | .................... | F02B 75/22 123/406.14 |
| 6,581,564 B2 * | 6/2003 | Ogawa | ................ | F02D 41/3064 123/295 |
| 6,651,020 B2 * | 11/2003 | More | .................. | H03M 1/1038 323/367 |
| 6,859,007 B2 * | 2/2005 | Toyozawa | ............. | G05B 19/19 318/609 |
| 6,889,152 B2 * | 5/2005 | More | .................. | H03M 1/1038 374/E3.009 |
| 7,027,913 B2 * | 4/2006 | Kobayashi | .......... | F02D 13/0207 701/114 |
| 7,042,190 B2 * | 5/2006 | Yaguchi | .................... | H02P 5/74 318/400.13 |
| 2002/0033164 A1 * | 3/2002 | Ogawa | ................ | F02D 41/3064 123/295 |
| 2002/0087281 A1 * | 7/2002 | More | .................. | H03M 1/1038 702/107 |
| 2004/0102914 A1 * | 5/2004 | More | .................. | H03M 1/1038 702/99 |
| 2004/0107041 A1 | 6/2004 | Kobayashi et al. | | |
| 2004/0145333 A1 * | 7/2004 | Toyozawa | ............. | G05B 19/19 318/632 |
| 2004/0150359 A1 * | 8/2004 | Yaguchi | .................... | H02P 5/74 318/400.02 |
| 2006/0042074 A1 | 3/2006 | Stork et al. | | |
| 2008/0087249 A1 | 4/2008 | Namari et al. | | |

FOREIGN PATENT DOCUMENTS

| | | |
|---|---|---|
| DE | 2947412 | 6/1981 |
| EP | 0130762 | 1/1985 |
| EP | 1 630 363 | 3/2006 |
| FR | 2967770 A1 * | 5/2012 |
| GB | 2059598 | 4/1981 |
| GB | 2065310 | 6/1981 |
| GB | 2328752 | 3/1999 |

* cited by examiner

SENSOR FOR MEASURING ANGULAR POSITION, AND MEASUREMENT COMPENSATION METHOD

The present invention relates to a sensor for measuring angular position, of the type comprising a toothed wheel and a method for compensating its measurement.

BACKGROUND OF THE INVENTION

A known solution for carrying out a measurement of the angular position of a rotating element is by equipping said rotating element with a toothed wheel with a detector, disposed facing it on a fixed structure, designed to detect the presence or the absence of a tooth. Such a detector, when the rotating element and hence the toothed wheel rotate, allows a crenelated signal c of the type shown, as a function of the time t, on the diagram 2 in FIG. 1B to be obtained. Such a signal c can be processed by integration or by counting of the teeth in order to obtain a signal a of the type shown, as a function of the time t, on the diagram 3 in FIG. 1C, which is indicative of the angular position α of said rotating element.

Such a sensor is conventionally used in the field of the control of internal combustion engines, with a toothed wheel typically comprising 60-2 teeth (60 teeth with an equal angular distribution and two contiguous missing teeth so as to form an index). Such a toothed wheel driven by the crankshaft provides a precise measurement of the angular position of the engine within its cycle.

A precise reference comprising a measurement of the angular position and a measurement of the time at the moment of said measurement of angular position allows the mechanical movement to be synchronized with the engine control means in order to accurately control events such as the ignition.

Time is conventionally measured by means of a clock producing a linear signal T of the type shown, as a function of time t, on the diagram 1 in FIG. 1A.

In order to provide a precise reference for angular position, at a chosen given moment in time, a simultaneous measurement of time and a measurement of the angular position must be available.

Obtaining such a measurement, which could then be used by a processing unit, may be carried out in several known ways.

According to a first way, a hardware acquisition device is employed to carry out such an acquisition, which is referred to as a hardware acquisition. Such a hardware acquisition device advantageously allows a deterministic and fast acquisition and hence a good precision on the time of acquisition. The simultaneous acquisition of two measurements, time and angular position, requires two such devices. However, such a hardware device is costly and it is natural to want to limit their number.

According to a second way, referred to as software acquisition, a software acquisition device, for example that forming the processing unit executing the method or else that executing the engine control program, is employed to carry out such an acquisition. Such a manner of acquisition does not increase the cost, in that it uses a pre-existing software device. However, as illustrated in FIG. 1D, such a software device suffers from a non-deterministic and long latency time or delay 5. Thus, a software acquisition triggered at the time t1 only carries out an acquisition of the angular position at the time t2, thus causing a corresponding measurement error Δα detrimental to operation as shown on the FIG. 1C.

Other high-performance software devices exist allowing a software acquisition to be carried out with performance characteristics comparable to those of a hardware device. However, such devices are very expensive and, consequently, excluded from the solutions to be envisioned for reasons of cost.

SUMMARY OF THE INVENTION

One problem to be solved by the present invention is to achieve a precise reference measurement at a given time t1, comprising a measurement of angular position and a measurement of time that are simultaneous, with a software device having standard performance characteristics and, at the most, one hardware acquisition device.

The principle is to carry out, by means of a hardware acquisition device, a precise measurement of the angular position α at time t1, where it is desired to have a reference comprising a measurement of angular position α and a measurement of time T1 that are simultaneous. A double software acquisition is furthermore triggered comprising a second measurement of angular position α' and a measurement of time T2 that are substantially simultaneous at the time t2. However, by reason of the time delay 5, this acquisition is only carried out at a later time t2 and leads to an erroneous measurement of time T2. An estimation of this error is made and a compensation for the measurement of angular position is applied, in order to determine an estimation of the measurement of time T1 at the time t1.

Thus, according to FIG. 2, the present invention relates to a method for compensating a reference measurement comprising a measurement of angular position α and a measurement of time T1 that are simultaneous at a time t1, for an angular position sensor of the type comprising a toothed wheel, comprising the following steps:

determination 10 of a first measurement of angular position α of the angular position at the moment in time t1 when a reference measurement is desired, triggering 20 of a software acquisition function, taking into account said function resulting in a time delay Δt, substantially simultaneous acquisitions 30 of a second measurement α' of the angular position and of a measurement T2 of the time by software acquisition at a time t2, estimation 40 of a time error ΔT, calculation 50 of the compensated measurement of time, T1=T2−ΔT.

According to another feature, the time error ΔT=T2−T1 is calculated according to the formula:

$$\Delta T = \frac{\Delta \alpha}{\text{Res\_dent}} * \text{Dur\_dent},$$

with:

ΔT=T2−T1=Δt, difference in the measurements of time between the moment in time t1 when a reference measurement is desired and the moment in time t2 when a second measurement of angular position α' and a measurement T2 of time are carried out, Dur_dent=duration of one tooth, Res_dent=angular resolution of one tooth, a constant equal to 360° divided by the number of teeth in said toothed wheel.

According to another feature, as shown on the FIG. 2, the determination of the first measurement of angular position α comprises a hardware acquisition 70 carried out by a hardware device performing an acquisition of the value of angular position at the moment in time t1 when a reference measurement is desired, and a software read 80 of said measurement of angular position α thus acquired.

According to yet another feature, as shown on the FIG. 2, said hardware device generates an interrupt 90, at the time t1, which is used to trigger said software acquisition function.

The invention also relates to a sensor for measuring angular position, of the type comprising a toothed wheel, comprising means for implementing the compensation method as claimed in any one of the preceding claims.

The invention also relates to the application of said sensor to the measurement of angular position of a crankshaft.

BRIEF DESCRIPTION OF THE DRAWINGS

Other features, details and advantages of the solutions implemented will become more clearly apparent from the detailed description presented hereinafter by way of example with reference to the drawings as follows.

DETAILED DESCRIPTION OF THE PREFERRED EMBODIMENTS

FIGS. 1A, 1B, 1C, and 1D illustrate the various quantities used in the above context presented on diagrams, disposed for comparison as a function of time t.

It is assumed here that, in order for example to be able to synchronize a mechanical event with an engine control software application, for a given moment in time t1, a double reference measurement, comprising a measurement of the time T1 and a measurement α of the angular position at this time t1, is obtained.

Figure 1A:
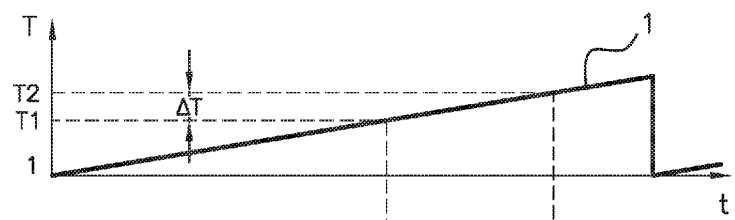
FIGS. 1A, 1B, 1C, and 1D present four diagrams in a comparative layout as a function of time t.
Figure 1B:
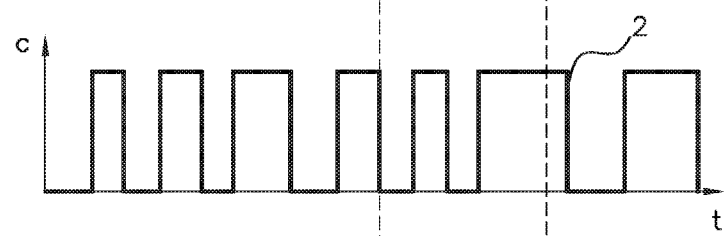

A measurement of the time T is obtained by means of a timer or clock producing a linear signal T as a function of time t, such as is shown on the FIG. 1A. Such a signal T is typically produced by a counter whose value is regularly incremented as a function of time. A counter typical comprises 24 bits and thus allows counting with a period $T_0$ of $10^{24}$, between 0 and $10^{24}-1$. At the end of this period, the counter is reset to zero, as illustrated on the right of the FIG. 1A, and re-starts its count. Such a reset to zero is not detrimental to the operation. In view of the period being long compared to Δt, it is certain that, at the most, one reset to zero can occur between t2 and t1. Thus, two cases may occur: Either, the measurement of time T2 at the time t2 is greater than the measurement of time T1 at the time t1 and ΔT=T2−T1. Or, exceptionally, if a reset to zero occurs in between, T2 is less than T1 and ΔT=T2'−T1, with T2'=T2+$T_0$. This case having been dealt with, it is considered for simplicity in the following part of the description that T2 is greater than T1. Similarly, the counter T does not necessarily measure a time in seconds, and it may be necessary to apply a correction function. It is assumed for the simplicity in the following part of the description that this correction function is already applied and that, at the very least:

$$\Delta T = T2 - T1 = \Delta t = t2 - t1.$$

As already described, a measurement of the angular position of a rotating element is obtained by equipping said rotating element with a toothed wheel and, disposed facing it on a fixed structure, a detector designed to detect the presence or the absence of a tooth. Such a detector allows a crenelated signal c of the type shown on the diagram 2 in FIG. 1B to be obtained.

Figure 1C:
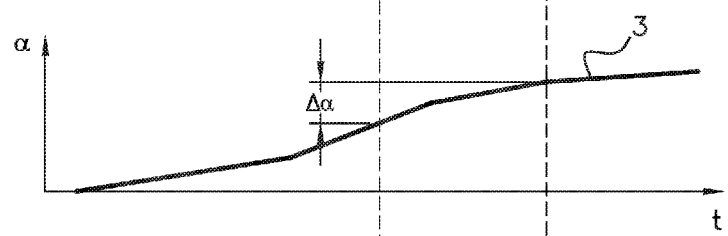

Such a signal c is processed by integration, by counting of the teeth or by any other more complex method so as to obtain a signal a of the type represented on the diagram 3 in FIG. 1C indicating the angular position α of said rotating element.

Figure 1D:
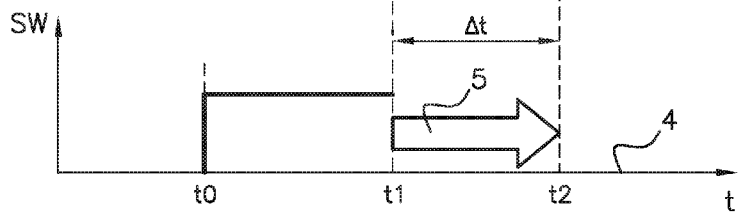

The diagram 4 in FIG. 1D, furthermore denoted SW, indicates the events relating to the software device on the same time scale t.

One problem for which the invention provides a solution is that of obtaining a measurement of time T1 and a measurement of angular position α at the same time t1. Moreover, this time t1 is imposed in that it is determined, for example, by an external event.

As previously indicated, a software acquisition does not allow an acquisition to be carried out at an imposed time t1. The reason for this is that, between the moment when a software acquisition request is triggered and the moment in time when it is effectively carried out, there is a time delay 5. This delay 5, also referred to as software delay, latency or "jitter", is linked to numerous factors that are uncontrolled and is unfortunately non-deterministic; it is not possible to predict its duration Δt. It is thus not possible to envision, in order to acquire a measurement at the imposed moment in time t1, the triggering of a software acquisition at t1−Δt.

A hardware acquisition allows such a measurement at an imposed time t1 to be carried out. However, since the aim is not to employ more than one hardware acquisition device, it is only possible to obtain a single measurement at the time t1, either the time T1 or the angular position α.

Figure 2:
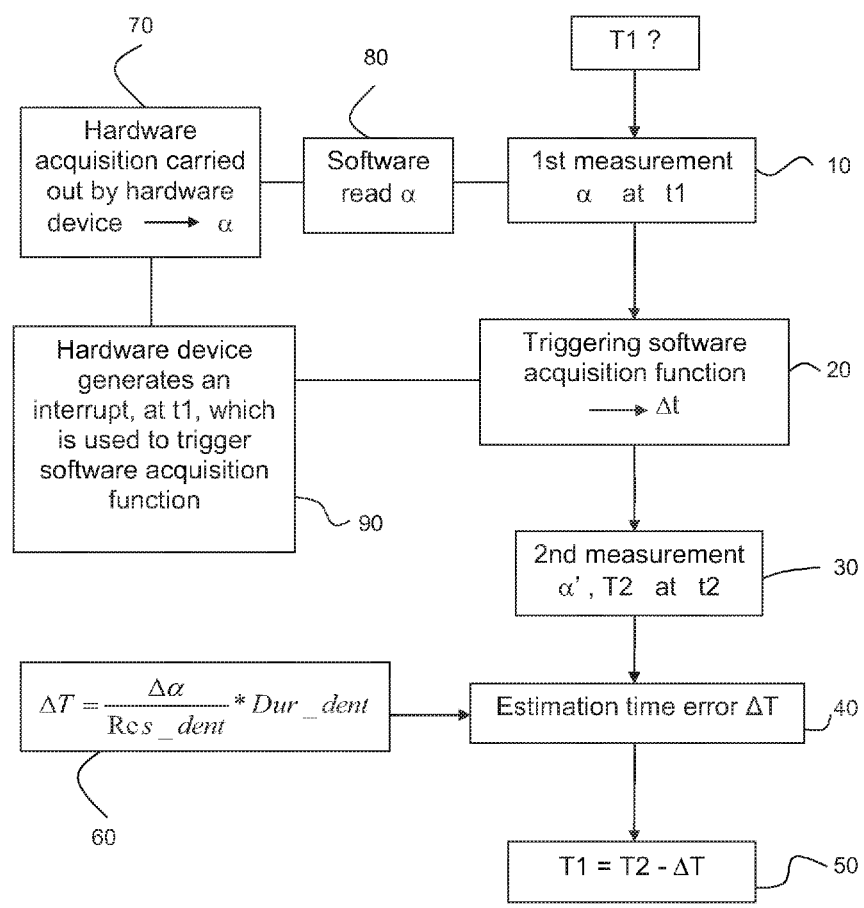
FIG. 2 presents a flow-chart of steps carried out by a preferred embodiment of the invention.

The method provided comprises the following steps, as shown on the FIG. 2. A first step 10 consists in determining a measurement of angular position α at the time t1 for which a reference measurement is desired.

In parallel, or following this, a software acquisition function is triggered 20. This software acquisition function is responsible for obtaining a measurement of angular position α' and a measurement of the time T2 at the time t2, these two measurements 30 being simultaneous or substantially simultaneous. As previously seen, even if the time of triggering of said software acquisition function is known, for example t1, a delay 5 of duration Δt necessarily occurs starting from this moment of triggering. For this reason, the measurements are effectively acquired at a time t2, different from t1, and the measurement of time T2 has an error ΔT with respect to the desired measurement T1.

The acquisitions of the measurements α' and T2 are thus delayed by the duration Δt of the time delay 5. The software function acts such that the measurement of angular position α' and the measurement of time T2 are simultaneous or substantially simultaneous. "Substantially simultaneous" is taken to mean that an exact simultaneity is not necessarily possible depending on the capacities of the software device which is, or uses, input/output devices which are most often sequential. However, the possible time difference between the two software acquisitions is still small compared to the other time delays of the problem, and may be ignored.

After having thus acquired, substantially simultaneously, a second measurement α' of the angular position and a measurement T2 of the time by software acquisition at the time t2, the method proceeds with a step for estimating 40 an error ΔT, between the effective measurement T2 at the time t2 and the desired measurement T1 at the time t1.

Based on this estimation of the error ΔT, a step calculates a compensated measurement of time T1, estimating the time at the moment in time t1 by subtracting from the measurement of time T2 α' at the time t2 said estimated error ΔT.

This error ΔT can be calculated by performing a linear extrapolation of the form Δt=k·Δα, with Δα=α'-α, the difference in angular position between the value of angular position at the moment in time t1 when a reference measurement is desired and the time t2 where a software measurement is carried out, and k a value estimating the slope of the curve t=f(α). A value k estimating the slope may be calculated by the formula:

$$k = \frac{Dur\_dent}{Res\_dent},$$

with

Dur_dent=duration of one tooth, and

Res_dent=angular resolution of one tooth.

The time difference Δt is considered 50 to be equal to the difference in the measurements of time ΔT=T2−T1.

The duration of one tooth is a variable. It is a recent measurement of the time taken for a tooth to pass in front of the detector. It is the 'temporal length' of a tooth, i.e. the period of time during which the signal c on the FIG. 1B remained in the high position, between a rising edge and the immediately following falling edge. This input to the method is conventionally supplied by a device external to the sensor, but it may also be integrated into this sensor. This variable tooth duration is obtained by any given means and, for example, by processing of the signal c on the FIG. 1B. This may be the length of the last tooth that passed in front of the detector. This value can be refreshed for each tooth or regularly for every n teeth. It could also be a mean, filtered or not, of this value over a recent time window.

The angular resolution or angular width of one tooth is a constant depending on the toothed wheel used by the angular position sensor. It is uniform in angle and is equal to 360° divided by the number of teeth on the toothed wheel. In the case of a wheel with 60 minus 2 teeth, the angular resolution is equal to 360/60, or 6°.

The parameter k is thus uniform in the inverse of an angular speed, and k·Δα, is uniform in duration. The resulting formula is as follows:

$$\Delta T = \frac{\Delta \alpha}{Res\_dent} * Dur\_dent$$

and enables the error ΔT to be calculated 60.

According to one feature, the determination of the first measurement of angular position α is carried out in two steps. A first step 70 is a hardware acquisition carried out by a hardware device. This device, triggered at the time t1, carries out an acquisition of the value α by acquiring the value of angular position α at the time t1. Depending on the embodiment, either the hardware device is triggered by the event linked to t1, or the hardware device is itself responsible for the event linked to t1 and decides when this moment occurs. The acquisition is carried out and stores said value of angular position α in a storage means. Reading this storage means is accessible to the software device. In a second step 80, said software device performs a software read of this storage means in order to obtain the measurement of angular position α.

According to another feature, the device responsible for the event occurring at the moment in time t1, either the hardware acquisition device or the device which has triggered 90 the hardware acquisition generates, at the time t1, an interrupt intended for the software device. This interrupt may be advantageously used to start the software device. In response to this interrupt, the software device can then perform the software read of the storage means so as to obtain the measurement of angular position α and additionally trigger the software acquisition function in order to obtain the measurements of angular position α' and of time T2, at the moment in time t2.

A time t0 also appears on the diagram 4 in FIG. 1D. According to one embodiment, the software device provides the configuration, control or programming of the hardware acquisition device so that the latter carries out an acquisition of the angular position α at the time t1 and, where appropriate, defines the time t1. This configuration then commences at an initial time t0.

The method recommended here, in its several variants, allows a measurement that is erroneous, since made with a delay, to be compensated by an estimation of the error, based on quantities that are known or otherwise determinable. This can be carried out by a standard software device associated with a single hardware acquisition device.

This method has been applied with success to an ignition control. The time t0 is the start of the charging of the coil, whereas the time t1 is the end of said charging and hence the effective production of the ignition. It is important to know the reference comprising the angular position α and the time T1 exactly at this moment in time t1. The external device defining t1 is therefore the device in charge of the control of the coil. The latter then sends a command, at the time t1, for the hardware acquisition of the angular position α and simultaneously informs the software device by an interrupt. In response, the software device reads the measurement α and triggers the software acquisition function resulting in the measurements α' and T2. In this case, the software device used is a microcontroller TRICORE® 1762.

The invention furthermore relates to a sensor for measuring angular position, of the type comprising a toothed wheel, comprising means for implementing the compensation method previously described. In this case, the sensor can incorporate a hardware device and a software device each, or in concert, designed to carry out the various steps of the compensation method.

What is claimed is:

1. A method of determining an angular position of a crankshaft of an internal combustion engine at a first moment in time t1 when a reference measurement is desired, using an angular position sensor that includes a toothed wheel driven by the crankshaft, the method comprising the steps of:

causing the angular position sensor to generate and store, in a memory accessible to a processing unit, a first measurement α of the angular position of the crankshaft at the first moment in time t1;

triggering a software acquisition function carried out by the processing unit, the software acquisition function including:

causing the angular position sensor to generate and store, in the memory accessible to the processing unit a second measurement α' of the angular position of the crankshaft at a second moment in time t2, the second measurement α' taking place after the generation of the first measurement α, and acquiring, from a time signal generator in communication with the processing unit, a second time value T2 corresponding to the second moment of time t2 of the generation of the second measurement α';

calculating an estimated a time error ΔT between the second time value T2 of the generation of the second measurement α' and a first time value T1 that corresponds to the first moment in time t1 of the first measurements α;

calculating of the measurement of the first time value t1, as T1=T2−ΔT;

determining the calculated first time value T1 as a measurement of the first moment of time T1 at which the first measurement α of the angular position of the crankshaft occurred, and using the first time value T1 and the first measurement α to allow a mechanical movement of the internal combustion engine to be synchronized with the engine controller for controlling operative events of the internal combustion engine.

2. The method as claimed in claim 1, where the determination of the first measurement of angular position α comprises a hardware acquisition carried out by a hardware device performing an acquisition of the value of angular position at the moment in time t1 when a reference measurement is desired, and a software read of said measurement of angular position α thus acquired.

3. The method as claimed in claim 2, wherein said angular position sensor, at the first moment in time t1, generates an interrupt that triggers the software acquisition function.

4. The method as claimed in claim 1, where the estimated time error ΔT=T2−T1 is calculated according to the formula:

$$\Delta T = \frac{\Delta \alpha}{\text{Res\_dent}} * \text{Dur\_dent},$$

with:

ΔT corresponding to Δt, which represents the difference between the first moment in time t1 and the second moment in time t2, Dur_dent=duration of one tooth of the toothed wheel of the crankshaft, Res_dent= an angular resolution of the one tooth, calculated as 360° divided by a number of teeth in said toothed wheel, and Δα= the difference in angular position between a value of angular position at the first moment in time t1 and a value of angular position at the second moment in time t2.

5. A sensor for measuring an angular position of a crankshaft of an internal combustion engine, comprising:

a toothed wheel;

an angular position sensor configured to operate with the toothed wheel to generate a first measurement of an angular position α of the engine within a cycle of the engine at a first moment in time t1; and a processing device, in a communication with the angular position sensor, configured to carry out the functions of:

carrying out triggering a software acquisition function, including:

acquiring, by way of the measurement sensor and the toothed wheel, a second measurement α' of the angular position of the crankshaft at a moment in time t2, and acquiring a measurement of a second time value T2 from a time counter, corresponding to the second moment in time t2 of acquisition of the second measurement α';

calculating an estimated time error ΔT between the second time value T2, and a first time value T1 that corresponds to the first moment in time t1 of the angular position α of the first measurement; and calculating the first time value T1, as T1=T2−ΔT;

determining the calculated first time value T1 as a measurement of the first moment of time t1 at which the first measurement α of the angular position of the crankshaft occurred, and using the first time value T1 and the first measurement α to allow a mechanical movement of the internal combustion engine to be synchronized with the engine controller for controlling operative events of the internal combustion engine.

* * * * *

UNITED STATES PATENT AND TRADEMARK OFFICE
CERTIFICATE OF CORRECTION

PATENT NO. : 10,234,262 B2
APPLICATION NO. : 13/885782
DATED : March 19, 2019
INVENTOR(S) : Jean-Marc Baissac Page 1 of 1

It is certified that error appears in the above-identified patent and that said Letters Patent is hereby corrected as shown below:

In the Claims

In Claim 1, Column 7, Line 15:
"surement of the first moment of time T1 at which the"

Should be replaced with:
--surement of the first moment of time t1 at which the--.

Signed and Sealed this
Thirtieth Day of July, 2019

Andrei Iancu
*Director of the United States Patent and Trademark Office*